(12) United States Patent
Ekeroth (10) Patent No.: US 7,422,688 B2
(45) Date of Patent: Sep. 9, 2008

(54) BIOLOGICAL WASTEWATER TREATMENT PROCESS AND REACTOR

(76) Inventor: Lars Ekeroth, Provst Bentzons, Soborg (DK) DK-2860

( * ) Notice: Subject to any disclaimer, the term of this patent is extended or adjusted under 35 U.S.C. 154(b) by 55 days.

(21) Appl. No.: 11/572,830

(22) PCT Filed: Dec. 16, 2004

(86) PCT No.: PCT/DK2004/000867

§ 371 (c)(1),
(2), (4) Date: Jan. 29, 2007

(87) PCT Pub. No.: WO2005/026062

PCT Pub. Date: Mar. 24, 2005

(65) Prior Publication Data

US 2007/0235388 A1    Oct. 11, 2007

(30) Foreign Application Priority Data

Aug. 3, 2004    (DK) ................. 2004 01180

(51) Int. Cl.
*C02F 3/00*    (2006.01)
(52) U.S. Cl. .............. 210/622; 210/629; 210/220; 210/196; 210/788; 210/221.1
(58) Field of Classification Search .......... 210/220, 210/194, 196, 629, 787, 788, 221.1, 622
See application file for complete search history.

(56) References Cited

U.S. PATENT DOCUMENTS

| 4,374,027 | A | 2/1983 | Severeid et al. |
| 5,645,726 | A | 7/1997 | Pollock |
| 6,245,237 | B1 * | 6/2001 | Blough et al. ............ 210/620 |
| 6,984,325 | B1 * | 1/2006 | Venable .................... 210/621 |

FOREIGN PATENT DOCUMENTS

| GB | 2057415 A | 4/1981 |
| JP | 59115777 A | 7/1987 |
| JP | 04 040295 A | 2/1992 |
| JP | 2002 307088 A | 10/2002 |

* cited by examiner

*Primary Examiner*—Chester T. Barry
(74) *Attorney, Agent, or Firm*—David A. Guerra (57) ABSTRACT

An aerated treatment of water is performed using a serially coupled reactor and flotation tank and is performed using so much activated sludge in the water that small bubbles from an aerator are entrained in the activated sludge, leading some of or all the activated sludge to flotate in the flotation tank. A reactor (1) and a flotation tank (36) for performing the process are equipped with at least one aerator (19, 20, 21, 22). A number of preferred processes and designs elaborate on the invention, including how the invention may be incorporated into existing wastewater treatment facilities and exploited there.

19 Claims, 4 Drawing Sheets

BIOLOGICAL WASTEWATER TREATMENT PROCESS AND REACTOR

TECHNICAL FIELD

The technical field of the invention is continuously or intermittently aerated, biological treatment of either wastewater or contaminated water intended for use or reuse, in one or more reactors.

Some concepts will be used in the following text:

Reactor

In all the following text, the word "reactor" is to be understood in the broad sense of the word, i.e. it is to be understood as any container of one or more reaction processes, regardless of whether the container is open at its top (e.g. a wastewater basin in a wastewater treatment plant) or essentially closed (as e.g. common, industrial fermentors). A reactor may well be part of a reactor plant in which a number of reactors and possibly other tanks are serially coupled, so that contents can move from one reactor or tank to another reactor or tank.

Loop Reactor

Similarly, the term "loop reactor" is to be understood in its broad sense, i.e. it is to be understood as any reactor of loop type, including but not limited to the well-known loop reactors for wastewater treatment, and loop fermentors of any kind, and may employ any means known in the art for propulsion of the reactor contents through the loop. Loop reactors may be of an outer type, which means that no part of the loop is surrounded by another part of the loop. Also, they may be of an inner type, which, in contrast, means that some part of the loop is actually surrounded by another part of the loop. This is especially well known in vertical loop reactors, in which a so-called 'downcomer' may be completely surrounded by the so-called 'upcomer' or vice versa. Inner loop reactors with a surrounding downcomer may employ one or more, internal upcomers, as may inner loop reactors with a surrounding upcomer employ one or more, internal downcomers. Employing more than one upcomer or downcomer provides a parallel coupling of loops in the reactor.

Loop Passage

A reactor loop has an average, inner length, and the reactor contents have an average speed of movement through the loop. When the average speed will have led to a movement covering the average, inner length of the reactor loop, one loop passage is said to have taken place. In the case of an aerated liquid, it is the average speed of the liquid which defines the term "loop passage".

Liquid-liquid Ejector

Liquid-liquid ejectors are ejectors in which a liquid is used as a motive fluid and a liquid is a suction fluid.

Activated Sludge

Activated sludge is sludge with a high content of living, microbial biomass. It is often used in treatment of wastewater and is then added to the wastewater as part of the treatment process. The activated sludge is then typically harvested from the treated wastewater, so that (at least a part of) the sludge can hereby be reused. Use of activated sludge is one way to conduct biological water treatment.

Entrainment of Bubbles in Suspended, Particulate Matter

Bubbles are said to be entrained in suspended, particulate matter, when the rising speed of the bubbles in the liquid containing both the suspended, particulate matter and the bubbles is substantially reduced by the presence of the particulate matter.

BACKGROUND ART

In a number of biological substance-turnover or substance-producing processes of various kinds, bubbles of air or other gas are introduced into or emerge in a usually aqueous liquid.

In some situations, the limiting factor for the turnover or production process is the removal of used bubbles.

This situation is known from the European patent EP 0 510 010, in which a centrifugal separator built into the loop of a loop reactor is used to carry out a complete or partial removal of the bubbles from the reaction liquid.

In other situations, the limiting factor for the turnover or production process is the oxygen consumption capacity of the liquid itself.

This may be the case in conventional use of activated sludge for treatment of water.

Treatment of water using activated sludge may be carried out using alternating periods of aeration and no aeration. Through this, nitrification of ammonium, nitrite, and organically bound nitrogen can be achieved in periods of aeration, whereas denitrification of nitrate and possible nitrite to gaseous nitrogen can be achieved in periods of no aeration.

The disadvantage to such an alternation between periods of aeration and periods of no aeration is that this—in conventional use of the activated sludge—is a slow process, measured as degree of achieved treatment per cubic meter of water per hour.

DISCLOSURE OF INVENTION

The present invention provides a teaching as to how the speed of a continuously or intermittently aerated, biological water treatment can be increased.

This is achieved by the process of the invention for continuously or intermittently aerated (using air with or without oxygen enrichment) treatment of water in a reactor, which process is characterized by the reactor being serially coupled to a flotation tank, and by the water, being aerated extensively in a continuous or intermittent mode, contained in the reactor and being passed into the flotation tank from the reactor containing so much activated sludge that small bubbles from an aerator of any suitable kind and placement are entrained in the activated sludge in the water, leading to flotation of some of or all the activated sludge in the flotation tank.

The present invention also concerns a reactor for performing the said process, which reactor comprises means for extensive aeration of the water. The reactor and aeration means, and the flotation tank, may be of any kind suitable for performing the said process.

The invention is based on a discovery disclosed herein of an ability of activated sludge, as it is known from wastewater treatment plants, to entrain small bubbles very effectively, if only a somewhat higher concentration than usual of the activated sludge is employed in the wastewater treatment.

Traditionally, around 4 kg of activated sludge is employed per cubic meter of wastewater. In the process of the invention, the optimal concentration of the activated sludge will depend on the nature of the sludge, which will in turn be dependent on the character of the wastewater and the design of the overall treatment process, but sludge concentrations in or around the interval of 40-100 kg activated sludge per cubic meter of water will probably be most beneficial.

The increased amount of activated sludge per cubic meter of water increases the oxygen consumption capacity in the water, whereby an increased aeration intensity can be employed and exploited, accelerating the treatment of the water. Similarly, the increased amount of activated sludge per cubic meter of water accelerates the denitrification processes taking place during any unaerated time periods.

These accelerations of the process rates are advantageous in that they provide a higher water treatment capacity per cubic meter of reactor volume, allowing a reduction in the number of and/or the sizes of prospective reactors and thereby providing savings in both the construction costs of water treatment plants and the maintenance costs of these.

It will not necessarily be all the sludge that flotates in the flotation tank, but the effectiveness of the flotation will be increaseable (and adjustable) through (adjusted) aeration into the flotation tank, preferably at a depth below the inlet for water, sludge, and bubbles from the loop reactor. Such aeration is best conducted by use of one or more liquid-liquid ejectors being supplied air, as described further below.

The flotated sludge may be led away (e.g. on a ramp or a belt conveyor or through pumping) from the flotation tank's upper part.

A smaller or larger part of the thus harvested sludge may be reused in the reactor.

In a preferred process according to the invention, the conduit leading water and activated sludge from the reactor to the flotation tank comprises a liquid-liquid ejector being supplied air into it or inside it and—by the interaction between the motive liquid and the suction liquid—committing this air into small bubbles being entrained in the activated sludge, the ejector thus acting as an aerator according to the invention. The ejector preferably receives, as a suction fluid, the complete flow of water and sludge being led directly into the conduit from the reactor.

The advantage to using the ejector is in that this provides a very even and effective distribution af small bubbles into the sludge to be flotated.

In yet a preferred process according to the invention, the reactor is a loop reactor, and the aeration bubbles used in the loop reactor are so small, having been produced in any way known in the art of producing small bubbles, that the bubbles are essentially entrained in the activated sludge in the water at at least one point of aeration and either kept entrained during the passage of the water through at least the majority of the reactor loop or at least released so slowly from the water that some of the bubbles remain in the water during the passage of the water through at least the majority of the reactor loop.

The advantage to entraining the bubbles in the sludge inside the loop reactor is that the hereby reduced bubble rising speed in the water reduces the energy consumption for the aeration, measured as the amount of energy used per kg of oxygen absorbed by the water.

In an outer or inner, vertical loop reactor (employing at least one downcomer and at least one upcomer), the reduction in the energy consumption is achieved in that the reduced rising speed of the bubbles makes the combined density of the water, sludge, and bubbles in the upcomer less different from the density of the same in the downcomer, whereby the energy consumption for propulsion of the water through the loop is reduced.

In a horisontal loop reactor (e.g. a basin with a central wall around which the water is circulating, thereby making it an outer loop reactor), the reduction in the energy consumption is achieved through the retention time of the bubbles in the water being increased, whereby the bubbles gain time to yield more oxygen to the water, before they reach the surface of the water.

In a one more, preferred process according to the invention, the loop reactor is essentially vertical, and small bubbles entrained in the activated sludge inside the loop reactor are being led with the water and activated sludge passed through the conduit to the flotation tank.

The advantage to the loop reactor being vertical is in that this makes it easier to ensure that the small bubbles stay entrained in the sludge, until the water reaches the upper part of the loop reactor. This also enables sludge with the same concentration of entrained bubbles as in the loop reactor to be led to the flotation tank, possibly making the ejector of the first-mentioned, preferred process obsolete.

In a further, preferred process according to the invention, the water in the loop reactor is, for each loop passage, supplied less oxygen than what the activated sludge could have consumed during the loop passage.

The advantage to this is in the discovery disclosed herein that small bubbles entrained in the sludge to a large extent are rather sedentary within the sludge, whereby the bubbles (when they are sufficiently low-numbered per small volume of water) divide the water and the activated sludge suspended in it into a spatial mosaic of oxygenated and essentially oxygen-free zones. Hereby, the nitrification and denitrification processes in the water can take place simultaneously within one and the same reactor and even with very short diffusion/convection paths for the nitrogen compounds involved in the processes.

Thus, one avoids having to separate the nitrification and the denitrification processes either spatially (e.g. into one each of two connected reactors) or chronologically (as in the BioDenitro process of the Danish company Krüger A/S).

This accelerates the treatment of the water even further, and in addition it simplifies both the construction of the water treatment plant and the operation of this.

Whereas one in the BioDenitro process optimizes the interplay between nitrification and denitrification by advancing or delaying the shift between various modes of operation, usually in two connected reactors, on the basis of measurements of dissolved nitrate and ammonium in the reactor or both the reactors, the preferred process disclosed here will allow one to optimize this interplay by measuring in just one reactor and by use, quite simply, of regulation of the aeration rate in this reactor—completely without any need for shifts between different modes of operation in the reactor.

In yet a preferred process according to the invention, bubbles are separated out of the water and its activated sludge during passage through a centrifugal separator, preferably a cyclone separator, built into the reactor loop, enhancing the removal of used bubbles from the water and sludge.

In a vertical reactor loop with a downcomer and an upcomer (out of which one may be part of more than one loop), the centrifugal separator may preferably be built in as the upper part of the upcomer.

In a further, preferred process according to the invention, the centrifugal separator is a cyclone separator with lamellae placed helically inside the cyclone separator, so that water and activated sludge may move longitudinally through the cyclone separator under simultaneous rotation by moving inside the spaces between the lamellae.

The advantage to the lamellae is that they may enhance the separation of the bubbles from the water and the sludge at high concentrations of the activated sludge.

In still a preferred process according to the invention, the aeration of the water and its activated sludge is performed by inlet of air into or inside one or more liquid-liquid ejectors in the loop reactor. The ejector or ejectors thus act as an aerator or aerators according to the invention.

The advantage to this use of liquid-liquid ejectors is that it allows for large-scale production of bubbles small enough to be entrained in the sludge.

This preferred process is especially advantageous if all or essentially all the water is led through the ejector or ejectors for every loop passage, so that the ejector or the ejectors are effectively part of the reactor loop. This spreads the bubbles very effectively out into all the sludge.

In the case of a vertical reactor loop with a downcomer and an upcomer (out of which the one part can be common to more than one loop), the ejector or ejectors may preferentially constitute the upper connection between the upcomer and the downcomer.

In a further, preferred process according to the invention, water with a reduced content of or completely without activated sludge is passed out of the flotation tank and into a liquid pump pumping the water to any of or all the above-mentioned liquid-liquid ejectors as a motive fluid, possibly together with water led directly from the reactor to the liquid pump.

The advantage to this preferred process is partly in that it has turned out that a reduced concentration of activated sludge in the motive fluid of the ejector or ejectors may improve the quality of the bubble formation in the ejector or ejectors, and partly in that the reduced concentration of the activated sludge better protects the microorganisms in this against damage caused by the liquid-pump.

In yet a preferred process according to the invention, water with a reduced content of activated sludge is passed out of the flotation tank and into a continuously or intermittently aerated, succeeding water treatment tank, i.e. a succeeding water treatment reactor.

The advantage to this preferred process is that it allows for a more complete treatment of the water without the activated sludge being nourished insufficiently in the first-mentioned reactor, i.e. the reactor passing water and sludge into the flotation tank.

In still a preferred process according to the invention, water with a reduced content of activated sludge is conducted out of the flotation tank and into a sludge precipitation tank, from which a part of the precipitated sludge may possibly be led or transported back into the first mentioned reactor, i.e. the reactor passing water and sludge into the flotation tank.

This precipitation will be necessary for the removal of the remaining sludge from the water, if not all sludge has been removed by flotation (and possibly also some precipitation) in the flotation tank and possible passing of water from the flotation tank to a liquid pump and/or a succeeding water treatment tank.

In any case, water will have to be led out of the flotation tank, if one is applied, and is there any activated sludge left in this water, then this sludge should preferably be precipitated out of the water in order for the water to have been properly treated.

The two last-mentioned, preferred processes according to the invention may, by the way, be combined such that water with a reduced content of sludge is led through the succeeding water treatment tank to the sludge precipitation tank.

Hereby, these two tanks will have worked roughly in the same manner as a complete water treatment plant of usual design.

Are the two tanks already constructed, then the invention will have supplemented a traditional water treatment plant with an extra reactor with an increased water treatment rapidity and possibly also simultaneous nitrification and denitrification and reduced energy consumption per kg of oxygen absorbed by the water. This will be an inexpensive, both in investment terms and in operating costs, increase in the overall capacity of an already existing water treatment plant.

In a further, preferred process according to the invention, the reactor passing water into the flotation tank is a loop reactor (as in other of the above, preferred processes), and new water to be treated is led into an unaerated or continuously or intermittently aerated, preceeding water treatment tank or reactor, and from this onwards into a liquid pump pumping the water to the loop reactor's liquid-liquid ejector or ejectors as a motive fluid.

The advantages to such a preceeding water treatment tank are well known and include conversion of phosporous compounds (when the preceeding water treatment tank is unaerated) and stripping of any dissolved and toxic gases and/or volatile liquids (when the preceeding water treatment tank is aerated).

In addition, a preceeding water treatment tank without direct throughflow of water to the loop reactor can be utilized as a buffer tank, so that variations in the inflow of new water to be treated can be smoothed out, providing a more even inflow of water into the loop reactor. That the preceeding water treatment tank in the preferred process according to the invention is capable of acting as such a buffer tank is due to the fact that the onwards flow of the water from the preceeding water treatment tank takes place through the water pump and the ejector/ejectors rather than by direct throughflow from the tank to the loop reactor.

If the concentration of activated sludge in the preceeding water treatment tank is either zero or lower than in the loop reactor, then the further advantages to using other water than water from the loop reactor itself in the liquid pump are as described earlier in the presentation of preferred processes.

The above, preferred process can be combined with the preferred process of passing of water from the flotation tank to the liquid pump.

Hereby, a control option is created, in that the proportion between how much water is flowing from the preceeding water treatment tank into the pump and how much water is flowing from the flotation tank into the pump will be adjustable.

If the water from the preceeding water treatment tank has a relatively high concentration of those substances, which are to be removed to a desired degree from the water, a hereto correspondingly reduced flow of water from the preceeding water treatment tank may be employed, so that the supply rate of these substances to the loop reactor is kept at a desired and not too high level.

Conversely, if the water from the preceeding water treatment tank has a lower concentration of the substances, then a faster flow of water from the preceeding water treatment tank may be employed, so that the supply rate of the substances to the loop reactor is kept at a desired level also in this situation.

Ideally, the proportion between how much water is flowing from the preceeding water treatment tank to the pump and how much water is flowing from the flotation tank to the pump will be subjected to on-line control based on measurement results from substance concentration meters measuring the quality of the water in the loop reactor, with the exception that a low water level in the preceeding water treatment tank should lead to a reduction in the flow of water from this tank to the pump, whereas a high water level in the preceeding water treatment tank should lead to an increase in the flow of water from this tank to the pump. The water level in the preceeding water treatment tank may be measured in any suitable way known in the art.

If a liquid-liquid ejector is employed as an aerator in the flotation tank or in the conduit leading to it from the loop reactor, then the motive fluid being used in this ejector should preferably be water from only the loop reactor and/or the flotation tank itself and not from the preceeding water treatment tank. Hereby, water from the preceeding water treatment plant has not been led past the loop reactor. Hence, all water from the preceeding water treatment tank will be treated in the loop reactor.

Is also one or more liquid-liquid ejectors employed as aerator/aerators in the loop reactor, then it will be necessary to use two liquid pumps for the motive waters to the ejectors, so that water from the preceeding water treatment tank is not mixed into the water from the loop reactor and/or the flotation tank being used as motive fluid in the ejector in the flotation tank or in the conduit leading to it from the loop reactor.

In one more, preferred process according to the invention, part of and only part of the activated sludge being reused in the loop reactor is supplied to this by being added to the water in the preceeding water treatment reactor and being transferred through the liquid pump and into the liquid-liquid ejector or liquid-liquid ejectors in the loop reactor.

The activated sludge being added to the water in the preceeding water treatment reactor may be harvested from the flotation tank, if one is employed, or from the precipitation tank, if one is employed, or from both of these.

The usual practice, which may actually be employed in the present invention as well, when reusing activated sludge harvested at the last in a series of tanks in a water treatment plant is to pass all the reused sludge back to the first (reactor) tank or tanks (if there are more than one in a parallel setting) in the series. In the process according to the present invention it is, however, when the passing of water and sludge from the first tank (the preceeding water treatment reactor) takes place through the liquid-liquid ejector or the liquid-liquid ejectors of the loop reactor, better to divide the activated sludge to be reused, such that only a part of the sludge is added to the water in the first tank, whilst the rest of the sludge is added directly to the water in the loop reactor.

Is e.g. 20 kg of activated sludge employed per cubic meter of water in the preceeding water treatment reactor, this will, however, increase the water treatment capacity of this approximately fivefold as compared to a preceeding water treatment reactor with only the usual 4 kg of activated sludge per cubic meter of water.

Hereby, the preceeding water treatment reactor will, at a plant redesigned to make use of the present invention, have its water treatment capacity increased sufficiently to make good use of the water treatment capacity increase obtained in the rest of the plant through employment of the present invention.

The preferred processes described above are to be understood as being combinable. That is, a given water treatment facility may employ any combination of the preferred processes consistent with the wording in the description of each preferred process and may even employ all of them. Any combination may be established in just one each of any reactor or tank mentioned above and being part of the combination or in a plurality of any of or all of such reactors or tanks.

BRIEF DESCRIPTION OF DRAWINGS

The invention will be further described in more detail with reference to the drawings, wherein.

Figure 1:
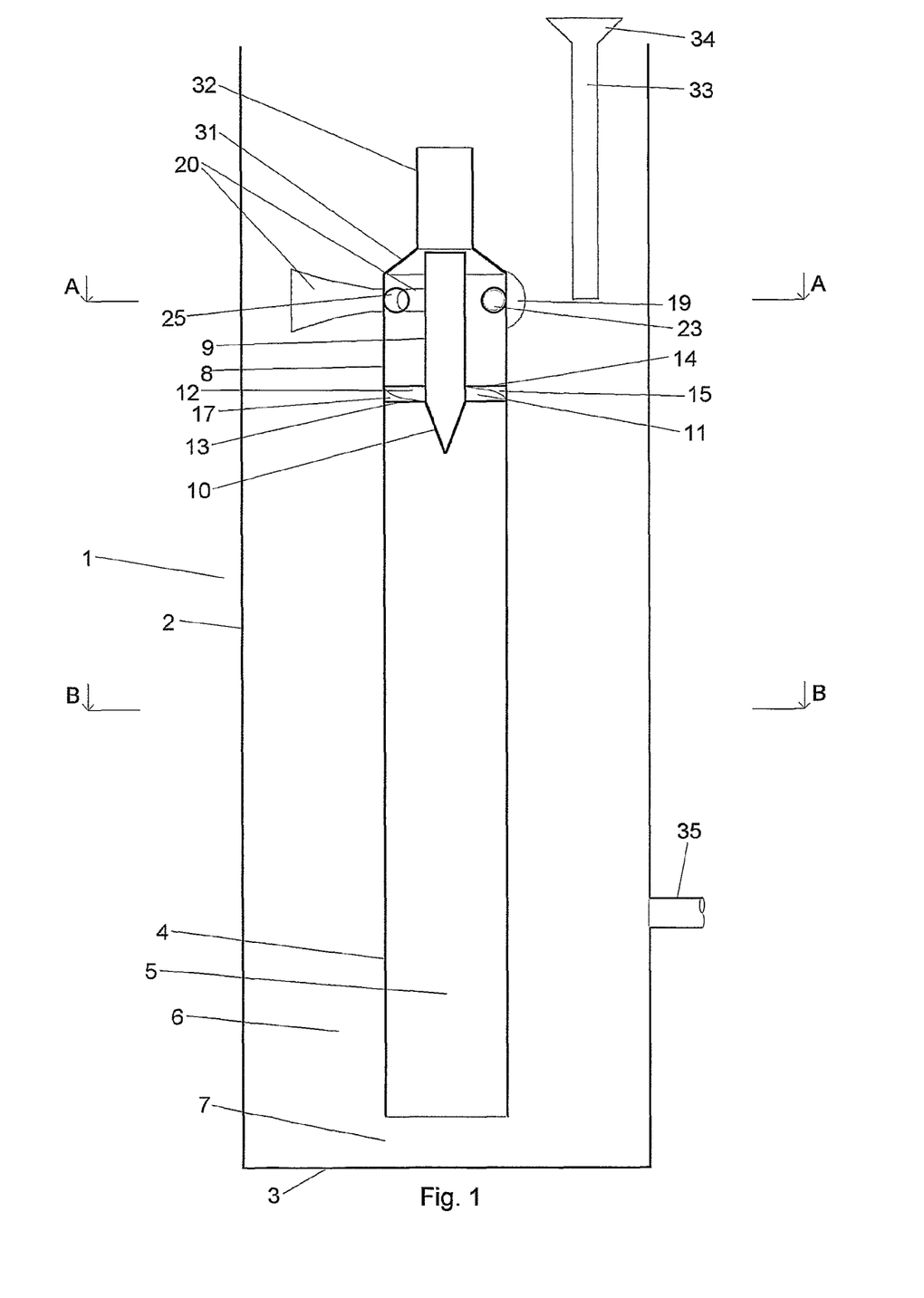
FIG. 1 is a longitudinal, sectional view executed through the axis of an embodiment of an inner loop reactor according to the invention.

The embodiment of an inner loop reactor 1 according to the invention depicted in FIG. 1 in an axially longitudinal, sectional view has an outer container wall 2 and an adjacent bottom wall 3 which together define a cylindrical reaction container (i.e. reactor), which is open at its top. An inner, cylindrical tube 4 defines an inner upcomer 5 in the reactor 1, i.e. water, sludge, and bubbles move essentially upwards in the upcomer 5. The cylindrical-annular space 6 surrounding the inner upcomer 5 is a downcomer in the loop reactor 1, i.e. water, sludge, and bubbles move essentially downwards in the downcomer 6. The outer downcomer 6 and the inner upcomer 5 are connected below 7 to each other at the free end of the inner tube 4. The upper end of the inner tube 4 is designed to be a cyclone separator 8. The cyclone separator 8 has an inner, cylindrical core 9, around which water, sludge, and bubbles rotate while continuing to move upwards (i.e. the movement is helical) during the separation of bubbles from the water and sludge. Beneath the cyclone separator 8, the inner core 9 is tapered by a frusto-conical extension 10.

In its lower end, the cyclone separator 8 is initiated by four helically arranged guiding plates 11, 12, 13, and 14 which direct water, sludge, and bubbles through four rectangular inlet apertures 15, 16 (not visible in FIG. 1), 17, and 18 (not shown in FIG. 1) leading into the cyclone separator 8. Hereby, the water, sludge, and bubbles are being given a rotational velocity component on their way into the cyclone separator 8. In FIG. 1, the introductory edge (in the cutting surface of FIG. 1) and the upper surface (behind the cutting surface of FIG. 1) of the guiding plate 11, the lower surface (behind the cutting surface of FIG. 1) and the terminating edge (in the cutting surface of FIG. 1) of the guiding plate 12, and (in the cutting surface of FIG. 1) the introductory edge of the guiding plate 13 and the terminating edge of the guiding plate 14 are visible. The inlet aperture 15 is constituted by the rectangular area defined by the introductory edge of the guiding plate 11, the terminating edge of the guiding plate 14, the inner tube 4, and the core 9, whereas the inlet aperture 17 is constituted by the ractangular area defined by the introductory edge of the guiding plate 13, the terminating edge of the guiding plate 12, the inner tube 4, and the core 9. Correspondingly, the inlet aperture 16 not visible in the Figure is constituted by the rectangular area defined by the introductory edge of the guiding plate 12, the terminating edge of the guiding plate 11, the inner tube 4, and the core 9, whilst the inlet aperture 18 not shown in the Figure is constituted by the rectangular area defined by the introductory edge of the guiding plate 14, the terminating edge of the guiding plate 13, the inner tube 4, and the core 9.

If there is a desire to have the cyclone separator 8 equipped with lamellae, as described above for one preferred process, then these lamellae may be devised similarly to the guiding plates 11, 12, 13, and 14 with the difference that their extension inwards from the inside of the inner tube 4 should not extend all the way to the core 9 of the cyclone separator 8.

At the upper end of the cyclone separator 8, four air-suction capable liquid-liquid ejectors 19, 20, 21, and 22 (not shown in FIG. 1) are mounted. The tubings leading motive fluid and air to the liquid-liquid ejectors are not shown; reference is made to FIGS. 5 and 6. The liquid-liquid ejectors 19, 20, 21, and 22 constitute the upper connection for water, sludge, and bubbles between the upcomer 5 and downcomer 6 of the loop reactor 1. In FIG. 1, the suction inlet 23 for liquid of the ejector 19 is seen in the cutting surface of the Figure, and behind the cutting surface of the Figure a further part of the ejector 19 is seen, the ejector 20 is seen behind the cutting surface of the Figure, and the suction inlet 25 for liquid of the ejector 21 is seen in the cutting surface of the Figure. The rest of the ejector 21 is in front of the cutting surface of the Figure, as is all of the ejector 22.

At its top, the cyclone separator 8 is delimited by a frusto-conical tapering 31 leading to a vertical tube 32 for withdrawal of bubbles and/or used air liberated from bubbles.

An inlet member for activated sludge, consisting of a tube 33 extending down into the downcomer 6 of the loop reactor 1 and on top of this tube 33 a funnel 34, is shown behind the cutting surface of the Figure.

The loop reactor 1 is to be understood as having a size consistent with it being used in a water treatment plant.

During operation of the loop reactor 1, the liquid-liquid ejectors 19, 20, 21, and 22 are supplied motive fluid, possibly from one or more liquid pumps, and air sucked in, preferably through a throttle valve controlling the aeration rate. The ejectors 19, 20, 21, and 22 pump water and sludge from the upcomer 5 of the loop reactor 1 to the downcomer 6 of the loop reactor 1. In addition to this, the ejectors 19, 20, 21, and 22 communicate the air being sucked in by them into suitably small bubbles distributed essentially evenly into the through the ejectors 19, 20, 21, and 22 flowing water and sludge.

Also during the operation of the loop reactor 1, some water with sludge and bubbles is passed out of the loop reactor 1 through an outlet member 35 having its inlet in the downcomer 6.

It is not crucially important for the operation of the loop reactor that the cross-sectional shape of the upcomer 5 is circular beneath the cyclone separator 8. Other cross-sectional shapes, e.g. polygonal, inclusive of quadratic and rectangular, are also usable. Similarly, the cross-sectional area of the upcomer 5 does not have to be the same beneath the cyclone separator 8 as inside the cyclone separator 8.

Nor does the shape of the downcomer 6 of the loop reactor 1 have to be cylindrical-annular; its outer wall 2 does not even have to be cylindrical. The outer wall 2 may have other cross-sectional shapes, e.g. polygonal, inclusive of quadratic and rectangular. Furthermore, the loop reactor can be made wider by the employment of more than one inner tube 4 equipped with everything required for its operation, including the cyclone separator 8 and ejectors 19, 20, 21, and 22. A plurality of such tubes 4 fully equipped can be placed at the same depth in but at different locations within a downcomer 6 wide enough for this and will then constitute a parallel coupling of upcomers 5 within one comment downcomer 6.

Also, the number of the ejectors 19, 20, 21, and 22 is not fixed. There does not have to be exactly four ejectors leading from the cyclone separator 8—or each cyclone separator 8 in case of employment of more than one inner tube 4. The number of ejectors from one cyclone separator 8 may be less than four, equal to four, or higher than four.

Nor do the ejectors 19, 20, 21, and 22 (if four of these are employed) have to be directed exactly horizontally outwards from the separator 8. The direction may well be obliquely upwards, so that the ejectors pass water, sludge, and bubbles not only outwards but also upwards from the cyclone separator 8. Obliquely downwards will probably be less advantageous.

Furthermore, the outlet member 35 does not have to have its inlet in the downcomer 6. The inlet may be positioned anywhere in the loop reactor but in the centrifugal separators and the ejectors.

Figure 2:
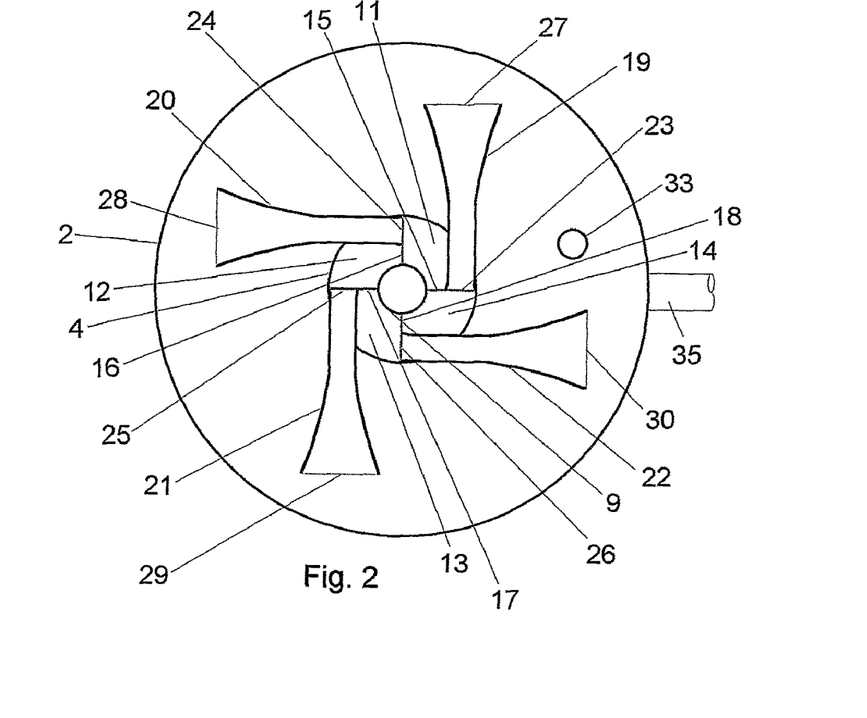
FIG. 2 is a cross-sectional view of an embodiment of an inner loop reactor according to the invention, taken along the line A-A in FIG. 1.

FIG. 2 shows a cross-sectional view taken along the line A-A in the loop reactor shown in FIG. 1. 2 Denotes the outer wall of the loop reactor (1 in FIG. 1), 4 denotes the inner tube (the section is taken through the cyclone separator (8 in FIG. 1)), and 9 denotes the core in the cyclone separator. Beneath the cutting surface of FIG. 2, the upper surfaces of the guiding plates 11, 12, 13, and 14 are visible, as are the positions of the inlet apertures 15, 16, 17, and 18, being bounded, as the inlets are, by the visible, terminating edges of the guiding plates and the introductory edges of these, as each of the introductory edges in this embodiment happens to be positioned directly underneath the terminating edge of one of the other guiding plates. In the cutting surface of the Figure, sections through the liquid-liquid ejectors 19, 20, 21, and 22 and their respective suction inlet apertures 23, 24, 25, and 25 for liquid (these suction inlet apertures are in the Figure coincidentally placed directly above part of one each of the inlet apertures 15, 16, 17, and 18) as well as the ejector outlet apertures 27, 28, 29, and 30 are visible. 33 Denotes the inlet tube for activated sludge, and 35 denotes the outlet member for water, sludge and bubbles from the downcomer 6.

Figure 5:
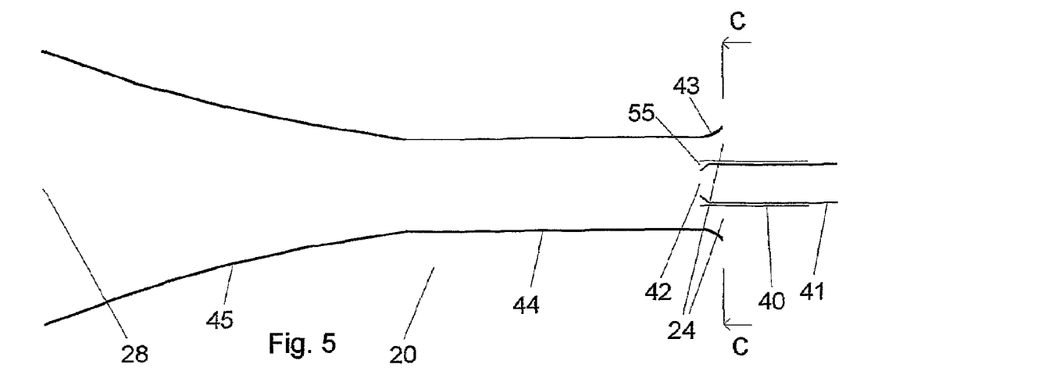
FIG. 5 shows a longitudinal section through the axis of an embodiment of a liquid-liquid ejector of a design useable in loop reactors according to the invention.
Figure 6:
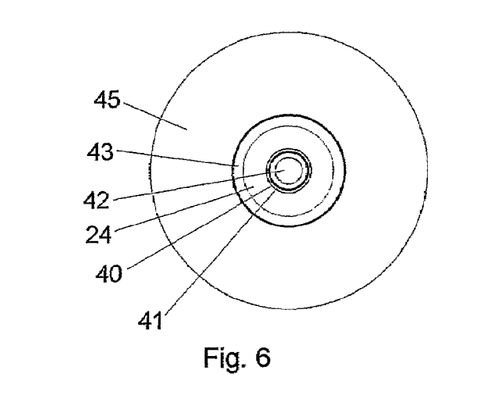
FIG. 6 is a cross-sectional view of the liquid-liquid ejector, taken along the line C-C in FIG. 5.

As in FIG. 1, the tubings leading motive fluid and air to the liquid-liquid ejectors are not shown; reference is made to FIGS. 5 and 6.

The disposition of the liquid-liquid ejectors 19, 20, 21, and 22 imparts a weak rotational movement to the water, sludge and bubbles at the top of the downcomer 6 of the loop reactor (1 in FIG. 1). This distributes the activated sludge from the inlet tube 33, in that this activated sludge moves with the surrounding water and sludge around the inner tube 4 and thereby becomes sufficiently dispersed to allow for it to be effectively mixed into the water, sludge and bubbles coming from the liquid-liquid ejectors 19, 20, 21, and 22.

Figure 3:
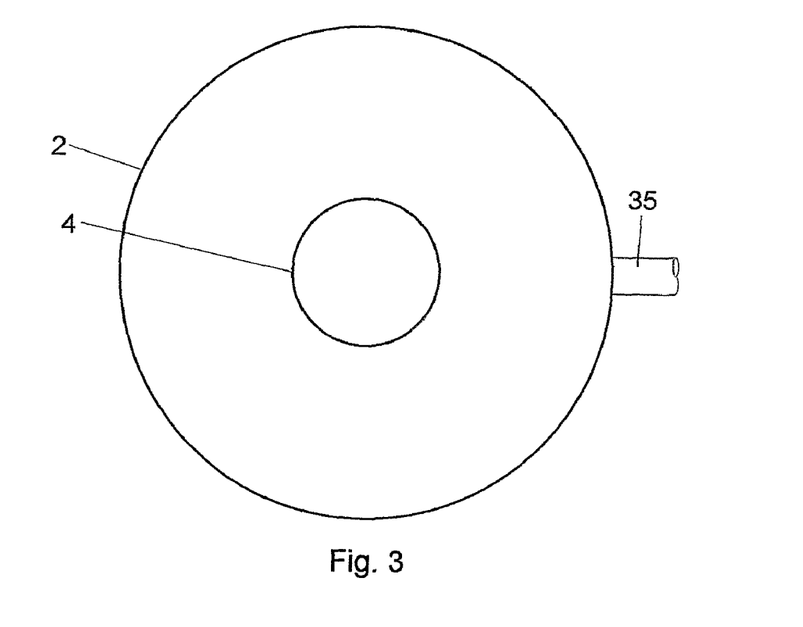
FIG. 3 is a cross-sectional view of an embodiment of an inner loop reactor according to the invention, taken along the line B-B in FIG. 1.

FIG. 3 shows a cross-sectional view taken along the line B-B in the loop reactor shown in FIG. 1. 2 Denotes the outer wall of the loop reactor (1 in FIG. 1), 4 denotes the inner tube (the section is taken beneath the cyclone separator (8 in FIG. 1)), and 35 denotes the outlet member for water, sludge and bubbles from the downcomer 6.

Figure 4:
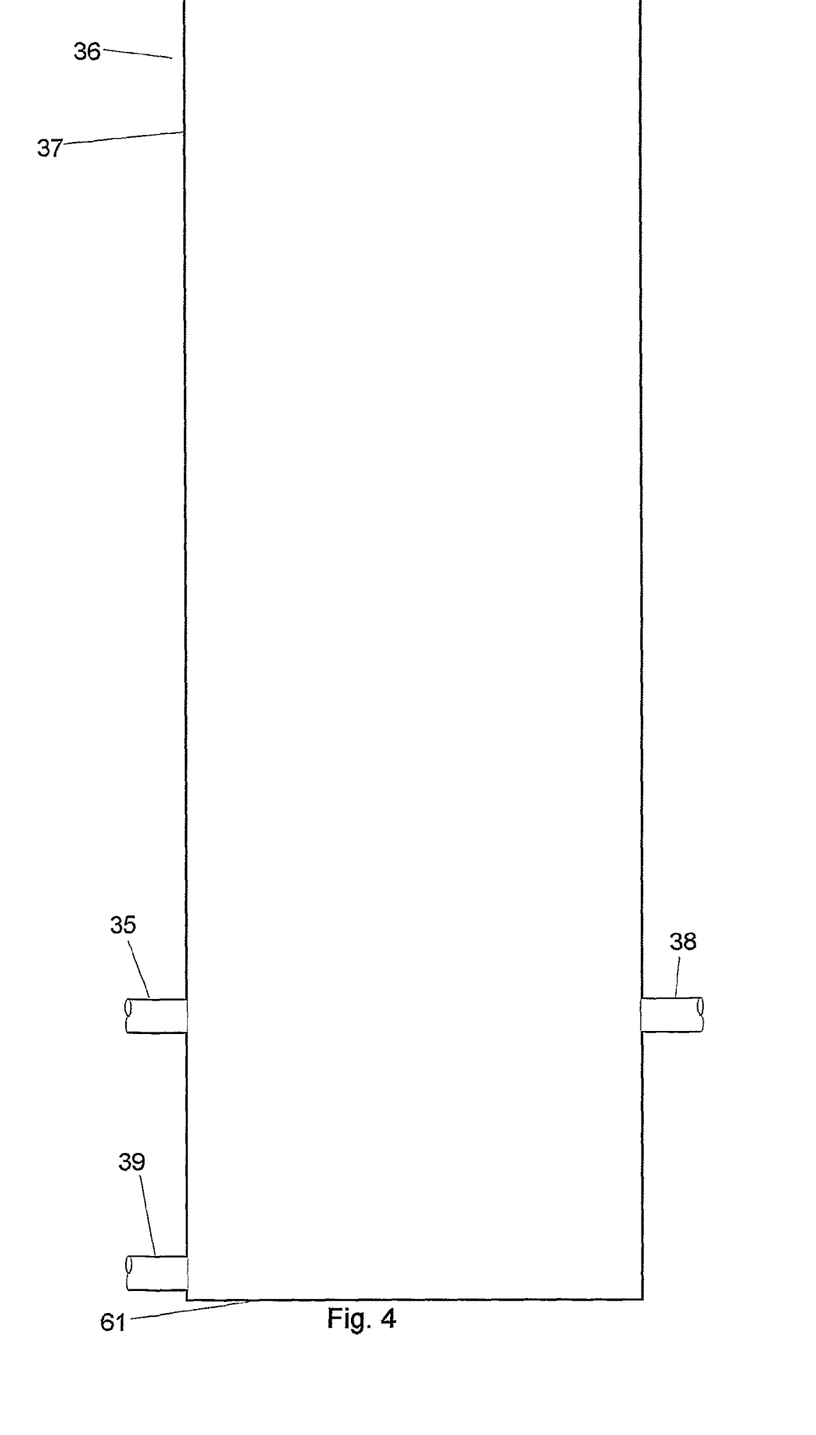
FIG. 4 is a longitudinal, sectional view executed through the axis of an embodiment of a flotation tank useable according to the invention.

FIG. 4 shows an axially longitudinal section through an embodiment of a flotation tank 36 for use according to the invention. The flotation tank 36 has an outer wall 37 and an adjacent bottom wall 61 as well as an inlet member 35 (which equals the outlet member 35 in FIGS. 1-3) for water, sludge, and bubbles from the loop reactor (1 in FIG. 1). In addition to this, the flotation tank 36 has an outlet member 38 for water either without activated sludge or with a reduced concentration of activated sludge and an additional outlet member 39 for water either without activated sludge or with a reduced concentration of activated sludge and for use as a motive fluid in the ejectors (19, 20, 21, and 22 in FIGS. 1-2).

Preferentially, the outlet member 38 is provided with a throttle valve or any other regulatory device known in the art for regulation of the flow rate through the outlet member 38. This provides a control of the amount of water present in the loop reactor (1 in FIG. 1) at any given rate of water flow into the loop reactor (1 in FIG. 1).

Furthermore, one or more aerators (not shown in the Figure), preferably one or more air-supplied liquid-liquid ejectors of a design more or less similar to the design of the ejectors (19, 20, 21, and 22 in FIGS. 1-2) in the loop reactor (1 in FIG. 1) but possibly smaller than these, can be commissioned in the lower part of the flotation tank, preferably below the inlet member 35. This will enhance the flotation of the activated sludge and thereby reduce the amount of activated sludge moving from the inlet member 35 to the outlet members 38 and 39.

The flotation tank 36 has been drawn slightly higher than the loop reactor (1 in FIG. 1) as an adaptation to the possibility of the upper sludge surface in the flotation tank being above the water surface in the loop reactor (1 in FIG. 1) due to bubbles trapped in the sludge in the flotation tank 36.

FIG. 5 shows an axially longitudinal section through an embodiment of a liquid-liquid ejector for use in a loop reactor according to the invention. Only the cutting surface itself is shown in the Figure.

Preferably, the liquid-liquid ejectors in the loop reactor (1 in FIG. 1) are of identical design. The Figure shows, as an instance, the ejector 20. 40 Denotes a tubular inlet member for air being sucked in, which air is introduced into the liquid-liquid ejector 20 through the inlet aperture 55. 41 Denotes a tubular inlet member for motive fluid (water and usually also some activated sludge—the motive fluid usually comes from a liquid pump but may alternatively be derived from a container with a higher water pressure at the level of the ejectors than in the loop reactor (1 in FIG. 1)). The tubular member 41 is terminated by a nozzle aperture 42. In the Figure, the tubular member 41 is shown as being longer than the tubular member 40. This is only in the drawing; both the two members will typically extend further than shown in the Figure. The ejector 20 has a suction inlet aperture 24 for water and sludge from the cyclone separator (8 in FIG. 1). In the Figure, the ejector 20 is shown with a funnel-shaped inlet section 43, which preferably joins the tubular mid-section 44 of the ejector smoothly, and which makes the cross-sectional area of the mid-section 44 smaller than the cross-sectional area of the suction inlet aperture 24. Such a funnel-shaped inlet section 43 may be advantageous by adapting the ejector 20 to a higher internal flow velocity than the flow velocity in the cyclone separator (8 in FIG. 1). The tubular mid-section 44 of the ejector 20 contains the mixing zone in the ejector. The ejector outlet aperture 28 of the ejector 20 has a larger cross-sectional area than the suction inlet aperture 24 and is positioned at the end of a preferably smoothly designed, gradually widening outlet section 45 which serves the purpose of braking the velocity of the water, sludge and bubbles prior to their exit out into the downcomer (6 in FIG. 1) of the loop reactor (1 in FIG. 1), thereby enhancing the ejector's 20 pumping efficiency.

FIG. 6 shows a cross-sectional view of the ejector in FIG. 5, taken along the line C-C in FIG. 5. Behind the cutting surface, the outer surface of the outlet section 45, the inner surface of the inlet section 43, and the noble aperture 42 are visible. In the cutting surface, the suction inlet aperture 24, the tubular air inlet member 40 and the tubular motive fluid inlet member 41 are visible.

Figure 7:
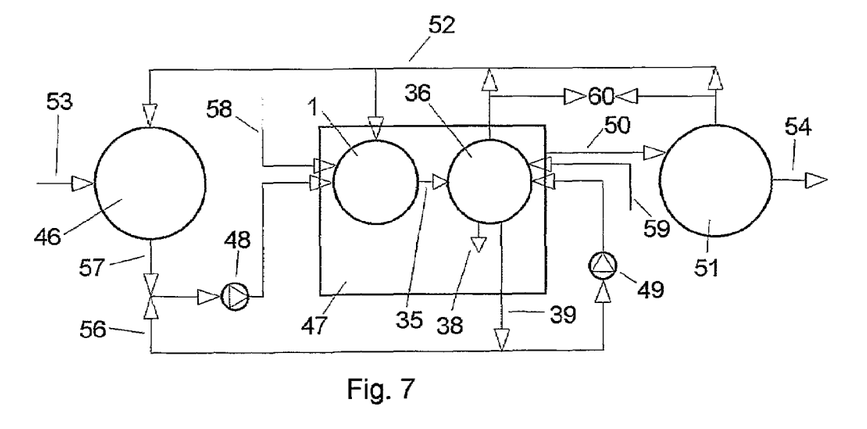
FIG. 7 is a flow chart of an embodiment of a water treatment plant including a loop reactor according to the invention.

FIG. 7 shows a flow sheet of an embodiment of a water treatment plant including a loop reactor according to the invention. 46 Denotes a preceeding water treatment reactor, and 47 denotes a succeeding water treatment reactor surrounding the loop reactor 1 and a flotation tank 36. 35 Denotes the conduit leading water, sludge, and bubbles from the loop reactor 1 to the flotation tank 36, 38 denotes a conduit or aperture for water and sludge from the flotation tank 36 to the succeeding water treatment reactor 47, and 39 denotes an outlet for water, possibly with some sludge in it, from the flotation tank 36 and for use as a motive fluid in ejectors. 48 Denotes a liquid pump supplying motive fluid to the ejector or ejectors (19, 20, 21, and 22 in FIGS. 1-2) of the loop reactor 1. The pump 48 receives water, possibly with some sludge in it, from the flotation tank 36 through a conduit 56 and also water with sludge from the preceeding water treatment reactor 46 through a conduit 57. 49 denotes a further liquid pump being supplied water, possibly with some sludge in it, from only the flotation tank 36 and to be used as a the motive fluid in one or more air-supplied ejectors in the lower part of the flotation tank 36. 50 Denotes a conduit passing water and sludge from the succeeding water treatment reactor 47 to a precipitation tank 51. Some harvested sludge is passed to the loop reactor 1 and the preceeding water treatment reactor 46 by the conduit or transporter (of any suitable kind known in the art) 52. It is possible to use two separate conduits or transporters 52, so that the harvested sludge passed to the preceeding water treatment reactor 46 can be of a composition differing from the composition of the harvested sludge passed to the loop reactor 1—e.g. sludge only from the flotation tank or sludge only from the precipitation tank or just another proportion between these than in the sludge passed to the loop reactor 1. Water to be treated in the plant is passed into the preceeding water treatment tank 46 through a conduit 53, and treated water is passed out of the precipitation tank through a conduit 54.

Valves of any kind known in the art may be provided in the conduits 56 and/or 57 for control of the flows of water from the preceeding water treatment reactor 46 and the flotation tank 36, respectively, to the water pump 48.

In the Figure, withdrawal 60 of surplus sludge is shown to take place from both the flotation tank and the precipitation tank. If less sludge is to be removed, then the removal may be arranged to be from only the precipitation tank.

58 Denotes a conduit passing air to the ejectors (19, 20, 21, and 22 in FIGS. 1-2) in the loop reactor 1. Preferably, a valve of any kind known in the art for control of the air flow into the loop reactor 1 is provided in the conduit 58.

59 Denotes a conduit passing air to one or more liquid-liquid ejectors in the lower part of the flotation tank 36. The deep position of the ejector or ejectors will make inclusion of an air pump in the conduit 59 advantageous. If an air pump is provided in the conduit 59, then the aeration rate in the flotation tank 36 will be adjustable through adjustment of the pumping work performed by the air pump.

For further illustration and explanation of the invention, the following shall be mentioned:

At the commencement of operations at a water treatment plant including both a loop reactor according to the invention and of further tanks at least the flotation tank and a succeeding water treatment reactor and a precipitation tank, initiation of the biological water treatment may be performed as a propagation of the activated sludge mainly in the succeeding water treatment reactor, with sludge being harvested in the precipitation tank and return of the harvested sludge to the succeeding water treatment reactor. During this phase, water may be led directly into the succeeding water treatment reactor, bypassing the loop reactor and flotation tank.

Before the concentration of the activated sludge passes the upper limit for effective precipitation in the precipitation tank, one begins passing sludge to the loop reactor.

During the initial passing of sludge to the loop reactor, it will be advantageous to close or at least limit the flow of water into the loop reactor, so that there will be either no flow at all or at least only a very limited flow of activated sludge out of the loop reactor, while the concentration of the activated sludge in the loop reactor is being increased.

When the concentration of the activated sludge in the loop reactor is sufficiently high, one may close any water flow bypassing the loop reactor, so that all subsequent water flow to the succeeding water treatment reactor takes place through the loop reactor and flotation tank. Similarly, one may at this point cease any passing of sludge directly into the succeeding water treatment reactor.

If there, during the commencement of operations, is also a preceeding water treatment reactor in use (as in e.g. the well-known BioDenipho process of Krüger A/S), then all said above for commencement of operations will still be valid. Preferably, the preceeding water treatment reactor should be in operation right from the start, receiving all water inflow to the plant and passing this on to either the succeeding water treatment reactor or the loop reactor, as described above for commencement of operations in a plant without the preceeding water treatment reactor. If the loop reactor is being bypassed initially, then part of or all the harvested sludge may be passed to the preceeding water treatment reactor and through this to the succeeding water treatment reactor.

BEST MODE FOR CARRYING OUT THE INVENTION

The best mode for carrying out the invention, at least when using the invention for treatment of waste water, is considered to be to use all the preferred processes described above, at least if very high concentrations of activated sludge are employed in the loop reactor. The use of lamellae in the cyclone separator may be omitted by using slightly lower concentrations of the activated sludge in the water, and the use of an aerator in the flotation tank and/or in the conduit leading water into this is only relevant in case of otherwise insufficient flotation of the activated sludge.

In addition to the embodiments of the invention as defined in the claims, the following embodiments are also preferred:

I. A process wherein air bubbles are being introduced into the flotation tank by an aerator placed inside the flotation tank, preferably beneath an inlet aperture for water from the reactor passing water and sludge into the flotation tank.

II. A process wherein activated sludge is being passed from the upper end of the flotation tank and into the reactor passing water and sludge into the flotation tank.

III. A process wherein water either devoid of activated sludge or with a reduced concentration of activated sludge is passed out of the flotation tank through an outlet aperture in the lower part of the flotation tank and through a conduit including a liquid pump onwards to one or more liquid-liquid ejectors in the reactor and/or the flotation tank and/or the conduit connecting the reactor to the flotation tank, said water acting as a motive fluid in said ejector or ejectors.

IV. A process wherein water with a reduced concentration of activated sludge is passed out of the flotation tank through a conduit or aperture leading the water into a continuously or intermittently aerated, succeeding water treatment reactor.

V. A process wherein water with a reduced concentration of activated sludge is passed out of the flotation tank through a conduit which leads the water, possibly through the succeeding water treatment reactor mentioned in the above process IV, into a precipitation tank, from which part of or all the precipitated sludge is possibly passed to the reactor passing water into the flotation tank.

VI. A process wherein the reactor passing water into the flotation tank is a loop reactor, and water, possibly containing activated sludge, from an aerated or unaerated, preceeding water treatment tank or reactor is led through a conduit including a liquid pump and onwards to one or more liquid-liquid ejectors in the loop reactor, said water acting as a motive fluid in said ejector or ejectors.

VIII. A process wherein a part of the activated sludge being passed to the loop reactor (e.g. as in the above processes II, V, or VI) is being passed via the preceeding water treatment reactor, so that the sludge is suspended in the water in the preceeding water treatment reactor and passed with this through the conduit and the liquid pump to the liquid-liquid ejector or the liquid-liquid ejectors in the loop reactor, whilst the remaining part of the activated sludge being passed into the loop reactor is passed directly into this.

The invention claimed is:

1. A process for effecting a continuously or intermittently aerated treatment of water in a loop reactor system, said process comprising the steps of:

providing a loop reactor comprising: a propulsive means for driving the circulation of water, sludge, and bubbles through a reactor loop; at least one small-bubble aerator capable of producing bubbles small enough to be essentially entrained in said sludge; and means for growing or supplying activated sludge in an amount leading to a concentration of activated sludge in said water in said loop reactor greater than 4 kg of activated sludge per cubic meter of water being treated and high enough to facilitate entrainment of said bubbles from said small-bubble aerator in said sludge; and growing or supplying said activated sludge in an amount leading to a higher concentration of activated sludge in said water in said loop reactor greater than 4 kg of activated sludge per cubic meter of water being treated and high enough to facilitate entrainment of bubbles from said small-bubble aerator, said bubbles thereby becoming essentially entrained in said activated sludge in said water in said loop reactor.

2. The process according to claim 1, wherein said small-bubble aerator is a liquid-liquid ejector being supplied air by introduction of this into its at least one throat, so that the air is being comminuted into said bubbles by the interaction between a motive liquid and a suction liquid inside said ejector.

3. The process according to claim 2 further comprising the step of passing essentially all of said water and its activated sludge through said ejector or a plurality of such ejectors for every loop passage, so that said ejector or plurality of ejectors effectively constitute part of said reactor loop.

4. The process according to claim 3 further comprising the step of generating a driving force provided by said ejector or plurality of ejectors for propelling said water with its sludge and bubbles through said reactor loop.

5. The process according to any of claim 4 further comprising the step of passing said reactor water, for each loop passage, through a centrifugal separator built into said loop reactor for separation of said bubbles from said water.

6. The process according to any of claim 5 further comprising the step of leading said separated bubbles either to the surface of said water or out of said loop reactor.

7. The process according to any of claim 6, wherein said centrifugal separator is a cyclone separator.

8. The process according to claim 6 further comprising the step of introducing air into a peripheral outlet conduit for water and sludge from said centrifugal separator.

9. The process according to any of claim 8 further comprising the step of coupling in series said loop reactor to a flotation tank, and that said small bubbles entrained in said activated sludge inside said loop reactor pass with said water and activated sludge through said conduit to said flotation tank, leading to flotation of some of or all said activated sludge in said flotation tank.

10. The process according to any of claim 9 further comprising the step of supplying less oxygen to said water, for each loop passage, than could have been utilized by said activated sludge in said water during the loop passage.

11. A loop reactor system for effecting a continuously or intermittently aerated treatment of water, said loop reactor system comprising:
- at least one downcomer and at least one upcomer being interconnected at a lower end of said upcomer and at an upper end of said upcomer, thereby constituting a reactor loop;
- a propulsive means for driving the circulation of water, sludge, and bubbles through said reactor loop;
- at least one small-bubble aerator capable of producing bubbles small enough to be essentially entrained in said sludge;
- means for supplying activated sludge in an amount leading to a concentration of activated sludge in said water in said loop reactor greater than 4 kg of activated sludge per cubic meter of water being treated and high enough to facilitate entrainment of said bubbles from said small-bubble aerator in said sludge; and
- a centrifugal separator incorporated into the upper part of said upcomer.

12. The loop reactor system according to claim 11, wherein said centrifugal separator is a cyclone separator integrated in such a way into the upper half of said upcomer that essentially all said water passing up through said upcomer passes through said cyclone separator on its way up inside said upcomer.

13. The loop reactor system according to claim 12, wherein said cyclone separator is integrated into the upper quarter of side upcomer.

14. The loop reactor system according to claim 12, wherein said aerator is a liquid-liquid ejector comprising an air inlet aperture positioned adjacent an inlet aperture for an ejector's motive fluid, terminating in a gradually widening outlet section, and constituting an upper connection between said upcomer and said downcomer.

15. The loop reactor system according to claim 14, wherein said ejector further comprises an outlet aperture being completely submerged in said water in said downcomer.

16. The loop reactor system according to claim 11 further comprising a flotation tank having a liquid-liquid ejector being supplied air into it and by the interaction between a motive liquid and a suction liquid committing this air into small bubbles.

17. The loop reactor system according to claim 16 further comprising a conduit leading said water and activated sludge from said loop reactor to said flotation tank.

18. The loop reactor system according to claim 17, wherein said ejector is built into said conduit so that it receives, as a suction fluid to said ejector, the complete flow of water and sludge being led directly into said conduit from said loop reactor.

19. A loop reactor system comprising:
- a loop reactor comprising: at least one downcomer and at least one upcomer being interconnected at a lower end of said upcomer and at an upper end of said upcomer, thereby constituting a reactor loop; a propulsive means for driving the circulation of water, sludge, and bubbles through said reactor loop; at least one small-bubble aerator capable of producing bubbles small enough to be essentially entrained in said sludge; means for supplying activated sludge in an amount leading to a higher concentration of activated sludge in said water in said loop reactor greater than 4 kg of activated sludge per cubic meter of water being treated and high enough to facilitate entrainment of said bubbles from said small-bubble aerator in said sludge; and a centrifugal separator incorporated into said upper part of said upcomer;
- a flotation tank having a liquid-liquid ejector being supplied air into it and by the interaction between a motive liquid and a suction liquid committing this air into small bubbles; and
- a conduit leading said water and activated sludge from said loop reactor to said flotation tank;
- wherein said ejector is built into said conduit so that it receives, as a suction fluid to said ejector, the complete flow of water and sludge being led directly into said conduit from said loop reactor.

* * * * *